(12) United States Patent
Clark

(10) Patent No.: US 7,108,230 B2
(45) Date of Patent: Sep. 19, 2006

(54) AIRCRAFT WITH TOPSIDE ONLY SPOILERS

(75) Inventor: Walter D. Clark, Fullerton, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 372 days.

(21) Appl. No.: 10/456,176

(22) Filed: Jun. 6, 2003

(65) Prior Publication Data

US 2004/0245379 A1 Dec. 9, 2004

(51) Int. Cl.
B64C 3/58 (2006.01)

(52) U.S. Cl. .................... 244/213; 244/198; 244/90 A; 244/45 R

(58) Field of Classification Search ................. 244/36, 244/213, 34 R, 198, 199, 45 R, 90 A, 160
See application file for complete search history.

(56) References Cited

U.S. PATENT DOCUMENTS

| | | | |
|---|---|---|---|
| D133,670 S | 9/1942 | Metz | |
| 2,303,713 A | 12/1942 | Thompson | |
| D136,664 S | 11/1943 | White | |
| D137,628 S | 4/1944 | Eshelman | |
| 2,402,118 A * | 6/1946 | Ashkenas | 244/90 A |
| 2,402,358 A | 6/1946 | Bauman | |
| 2,406,506 A * | 8/1946 | Northrop | 244/13 |
| 2,431,293 A | 11/1947 | Zimmerman | |
| 2,494,208 A * | 1/1950 | Schultz | 244/90 A |
| 2,925,232 A | 2/1960 | Murray et al. | |
| 3,184,186 A | 5/1965 | Ikai et al. | |
| 3,570,789 A | 3/1971 | Rainey | |
| 3,625,459 A | 12/1971 | Brown | |
| 3,761,041 A | 9/1973 | Putman | |
| 4,019,699 A | 4/1977 | Wintersdorff et al. | |
| 4,039,162 A * | 8/1977 | Calhoun et al. | 244/213 |
| 4,270,712 A | 6/1981 | von der Decken et al. | |
| 4,591,113 A | 5/1986 | Mabey | |
| 4,896,846 A | 1/1990 | Strom | |
| 5,062,595 A | 11/1991 | Maxworthy | |
| 5,082,204 A * | 1/1992 | Croston | 244/126 |
| 5,094,411 A | 3/1992 | Rao | |
| 5,255,881 A | 10/1993 | Rao | |
| 5,564,652 A | 10/1996 | Trimbath | |
| 6,491,261 B1 | 12/2002 | Blake | |

FOREIGN PATENT DOCUMENTS

| | | |
|---|---|---|
| GB | 344653 | 3/1931 |
| GB | 595118 | 11/1947 |
| JP | 09024897 A | 1/1997 |

* cited by examiner

Primary Examiner—Peter M. Poon
Assistant Examiner—Timothy D. Collins
(74) Attorney, Agent, or Firm—Benjamin T. Queen, II; Pietragallo, Bosick & Gordon

(57) ABSTRACT

An aircraft with swept back wings and spoilers inlaid into the top surface near the tips of the wings. The aircraft also includes an elevator formed in the center back portion of the aircraft, which is also aft of the spoilers. It is aft to allow an auxiliary control in the elevator signal to cancel the unwanted pitch up moment caused by the spoilers only going up and being aft of the center of gravity of the aircraft. Roll is achieved with these spoilers by the direct action of the lift dumping on one side or the other and by taking advantage of the transformation of yaw into roll by the sweep back of the wings.

16 Claims, 1 Drawing Sheet

AIRCRAFT WITH TOPSIDE ONLY SPOILERS

FIELD OF THE INVENTION

The invention relates generally to aircraft, and more particularly, to the control of aircraft which need to be stealthy.

BACKGROUND INFORMATION

Aircraft purposefully built to avoid radar detection are characterized by shapes with as few different angles as possible. This results in edges which are parallel to each other even if on opposite sides of the aircraft. It is also desirable to have a fuselage that is blended into the wing where any shapes of small radius can be placed on the upper side, unseen by ground radar. Because of this smooth integration, these aircraft are sometimes referred as "flying wings" and are typically characterized by a swept back wing configuration. An example of such an aircraft is the B-2 bomber.

An aircraft of low radar cross section is devoid of any unnecessary protuberances such as a vertical stabilizer, having its function replaced by control surfaces that increase the drag on one wing or the other only when needed and otherwise lie against the wing to become part of the wing. The advantages of all-wing, tailless aircraft are known. For example, tailless aircraft provide enhanced stealthy operating characteristics due to their inherent low-observable configuration. Moreover, all-wing aircraft provide other benefits such as improved efficiency due to reduced weight and drag and, accordingly, are well suited for use in a wide variety of applications such as in autonomous (unmanned) aircraft where the bulge for a pilot to look out doesn't have to be accommodated.

A disadvantage of the tailless aircraft configuration lies in the absence of an aircraft rudder normally incorporated within the vertical tail section. The rudder is provided in conventional aircraft to create a side to side or yaw moment to the aircraft in flight. Therefore, without a rudder, other means must be provided to impart yaw moment to the tailless aircraft. In addition, it is well known in conventional aircraft to provide ailerons to control roll movement of the aircraft in flight. Typically the rudder works in association with the ailerons on conventional aircraft to counter any adverse yaw during roll. Thus, in the absence of a rudder for the tailless aircraft configuration there is an absence of a means for countering the described adverse yaw.

As such, based upon the foregoing, there exists a need for an improved method and device, which improves aircraft roll control characteristics while countering any adverse yaw characteristics without substantially interfering with the aircraft aerodynamic and radar observability characteristics.

SUMMARY OF THE INVENTION

An aspect of the present invention is to provide a low-observable aircraft that includes an integrated fuselage and first and second swept back wings that generally define the aircraft. The aircraft also includes a first spoiler positioned on a top surface of the first swept back wing and a second spoiler positioned on a top surface of the second swept back wing. A control surface such as, for example, an elevator, is integrally formed with the integrated fuselage and wings. The control surface should be positioned generally aft of the first and second spoilers and if in two parts are preferably symmetrically disposed about the longitudinal axis of the aircraft. The first and second spoilers are advantageously structured and arranged to provide for roll control of the aircraft. This is accomplished by the aircraft having no additional spoilers or no additional controller surfaces.

Another aspect of the present invention is to provide a system for providing roll control of a low-observable aircraft having a pair of swept back wings that includes a spoiler formed on a top surface only of each of the pair of swept back wings and an elevator formed on an aft portion of the pair of swept back wings. The elevator is generally positioned aft of the spoilers and generally disposed symmetrically between the spoilers. Advantageously, the spoilers and the elevator are individually moveably connected to the wings to take advantage of the conversion of yaw into roll by the action of the swept back wing.

A further aspect of the present invention is to provide a method for providing roll control of a low-observable aircraft having a pair of swept back wings. Specifically, the method may include positioning a spoiler on a top surface only of each of the pair of swept back wings and positioning an elevator on an aft portion of the pair of swept back wings. The method further may include individually operating each of the spoilers and the elevator to provide roll control of the low-observable aircraft. In addition, the method may include individually operating the spoilers and the elevator to take advantage of yaw into roll by the action of the swept back wing.

These and other aspects of the present invention will be more apparent from the following description.

DETAILED DESCRIPTION

Figure 1:
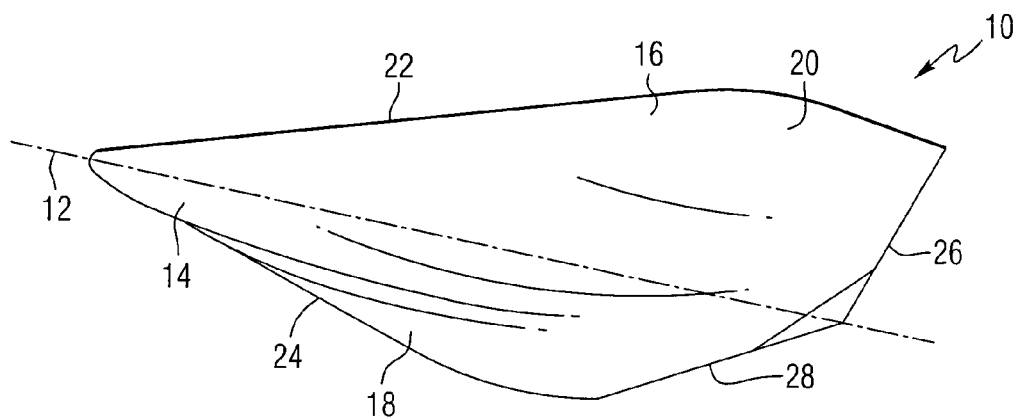
FIG. 1 is a schematic representation of a perspective view of the bottom side of a swept back aircraft that can by constructed in accordance with this invention.

In accordance with an aspect of the invention, a flying wing tailless aircraft comprises an integrated fuselage/wing that generally defines the aircraft and control surfaces integrally formed therewith. FIG. 1 is a schematic representation of a perspective view of the bottom side of a swept back aircraft 10 that can by constructed in accordance with this invention. The aircraft 10 has a longitudinal axis 12 and is provided with a central fuselage 14 positioned along the longitudinal axis. A pair of opposing swept back wings 16, 18 extend laterally and in an aftward direction from the fuselage 14. The wings 16, 18 have an outer contour which blends smoothly and continuously with that of the fuselage 14. In this respect, the fuselage 14 is completely integrated with the wings 16, 18. This smooth integration is contemplated to give the entire aircraft 10 an outer mold line that is free of any discontinuities in curvature. Thus, the integrated fuselage/wing configuration generally defines the aircraft 10. As such, the aircraft 10 may be characterized by having a relatively low aspect ratio and a generally diamond or kite shaped planform.

The aircraft 10 is provided with an upper surface and a lower surface. The upper and the lower surfaces encompass both the fuselage 14 and the wings 16, 18. FIG. 1 shows the lower surface 20. In addition, the wings 16, 18 include leading edges 22, 24, respectively. The leading edges 22, 24 are configured to, for example, form a continuous straight contour. Such a straight contour is desirable in light of radar signature mitigation considerations, i.e., forming a low-observable aircraft. The leading edges 22, 24 of the wings 16, 18 along with the upper surface of the aircraft 10 generally define the aerodynamic lifting surface of the aircraft 10. As such, the aerodynamic lifting surface is generally disposed about the fuselage 14 and the wings 16, 18. The wings 16, 18 also include trailing edges 26, 28, respectively.

Figure 2:
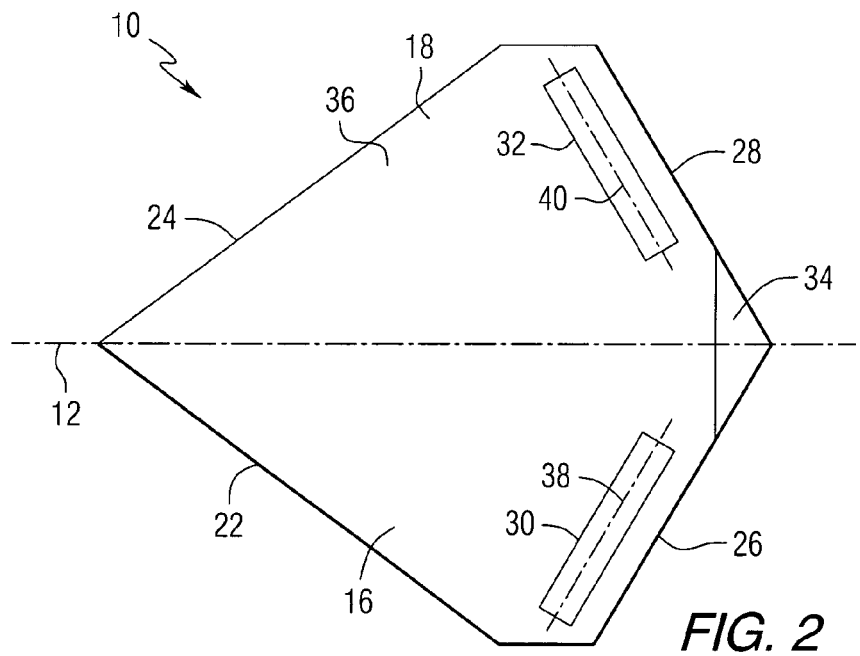
FIG. 2 is a schematic representation of a top plan view of the aircraft of FIG. 1, showing topside only spoilers.

FIG. 2 is a schematic representation of a top plan view of the aircraft of FIG. 1. As seen in FIG. 2, the aircraft 10 also includes control surfaces 30, 32 and 34 that are integrally formed with the upper surface 36 of the fuselage/wing configuration. Specifically, the control surfaces may include spoilers 30, 32 that are formed on the topside of the aircraft 10, i.e. on the upper surface 36 of the fuselage/wing configuration. Preferably, the spoilers 30, 32 are formed adjacent the trailing edges 26, 28, respectively of the wings 16, 18. The spoilers 30, 32 each include a longitudinal axis 38, 40, respectively, that extends preferably parallel to the trailing edges 26, 28.

The set of control surfaces may also include an elevator 34 formed on or adjacent an aft portion of the aircraft 10, and more specifically on or adjacent an aft portion of the wings 16, 18 ahead of the trailing edges 26, 28. The elevator 34 includes a first end that terminates at the trailing edge 26 and a second end that terminates at the trailing edge 28.

Advantageously, this invention permits a reduction in the aircraft radar cross-section by providing topside spoilers 30, 32 only and no spoilers or similar control surfaces formed on the bottom of the aircraft so that surface discontinuities in the bottom of the aircraft can be minimized. The particular problem with spoilers or other control surfaces, and particularly ones formed on the bottom of the aircraft, with regard to radar signature is that in opening they form an acute angle with the surface they rise out of. This creates a retro-reflecting structure for radar to bounce off of.

Advantageously, the spoilers 30, 32 and the elevator 34 are individually movably connected to or formed on the pair of swept back wings 16, 18 for providing roll control by taking advantage of the conversion of yaw into roll by the action of the swept back wing. This may be accomplished by the aircraft not having any additional spoilers or control surfaces.

Figure 3:
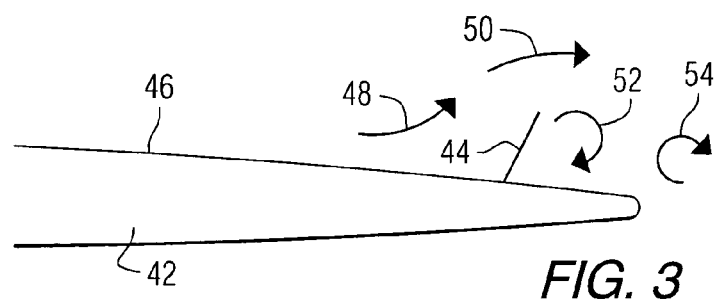
FIG. 3 is a schematic representation of a side view of a portion of a wing and a spoiler.

Differential spoilers, such as spoilers 30, 32 may affect the roll control in many ways. For example, the spoilers may affect the lift directly on one side or the other of the aircraft 10 and/or they may cause drag on one side or the other of the aircraft 10. More specifically, when a spoiler on top opens up, air is deflected upward which results in a down force. For example, FIG. 3 is a schematic representation of a side view of a portion of a wing 42 and a spoiler 44 positioned on a top surface 46 of the wing. Arrows 48, 50, 52 and 54 illustrate air flow in the vicinity of the spoiler 44 showing how air is deflected upward with a consequent down force. Another way of looking at this is the dumping of lift. The force is only down. A roll moment is produced even if the other wing is not pushing the other way. This roll moment is a function only of speed. That means when the aircraft 10 is going fast, i.e., low angles of attack, the spoilers do not need to be raised as far up to affect a nominal role rate.

In addition, the spoiler 44 causes drag. When the wing it is on is swept back, the differential drag is converted into roll. The open spoiler turns one leading edge more towards the wind, which because of the airplane's sweepback, this results in a roll moment. The sweepback transforms the yaw into roll. The roll moment is thus an indirect result of the drag on one side of the aircraft. If the spoiler 44 is on the top surface 46 of the wing 42, the two different types of roll moment described hereinabove are in the same direction and add their forces. One type of roll moment adds more at high speed, i.e., low coefficient of lift, and the other adds more at low speeds, i.e., high coefficient of lift. The indirect roll moment described herein has to do with the sweep back where the amount of that conversion is related to the angle of attack. The effectiveness of transforming yaw into roll improves with angle of attack. At low lift, the phenomenon of differential drag caused roll is stronger than the direct force caused moment. At high angles of attack, when the aircraft is moving slowly, the direct force is stronger. Where one is strong, the other is weak. Testing of models has shown that adverse yaw is essentially absent. Thus, the significance of that is that the control that is least stealthy, i.e., directional control, can be eliminated.

As the angle of attack increases, the ability of the sweepback to transform yaw into roll increases as well. At fairly high angles of attack, e.g., corresponding to landing and takeoff, the spoilers begin to lose their ability to be drag devices, but conversion is more effective. At very high angles, the difference in drag is reduced but the direct lift dumping effect remains. This effect is also available to the spoilers on a wing with ailerons, but the spoiler is usually fully devoted to canceling the adverse yaw of the ailerons and the direct lift-dumping effect is typically unnoticed. However, when the only lateral control is spoilers, such as the spoilers 30, 32 described herein, there is no up-going wing. That is, the only change in drag is an increase in drag and that is on the down-going wing side, i.e., the inside wing in a turn. Lift spoiling as a control device can increase up until the air is no longer flowing over the surface. After that, control over roll and drag is reduced.

It will be appreciated that differential spoilers do not produce adverse yaw, rather ailerons do. With conventional airplanes, when ailerons are deflected, there is no change in the angle of attack of the aircraft. The only change is aileron deflection, which affects the wing's camber. On one side the camber is changed so that the wing lifts more, while on the other, less. It is the reduced lift on one side and the increased lift on the other that introduces a differential of drag, namely because increased lift is always associated with increased drag no matter where you are on the lift curve. On the other hand, when topside only spoilers rise up, they are always being drag devices. When one surface is acting, the other wing has no control surface movement. It may be observed that the side with no change is not really going up, rather the other wing is dropping. The roll is one where the center of gravity of the airplane drops with every change in bank angle.

The preferred planform of the aircraft 10 is a diamond shape, although it will be appreciated that other shapes may be utilized with the invention. The diamond shape allows the elevator 34 to be aft of the spoilers 30, 32 while at the same time retaining the stealthy flying wing shape. The elevator 34 has to be aft of the spoilers 20, 32 to cancel the up moment created by the spoilers. Normally spoilers are deployed on both top and bottom sides of the wing so that when surfaces are actuated, the pitch moment forces cancel. Here the spoilers 30, 32 go up only. That canceling is done by the elevator 34.

Experimental tests were performed with flying models to demonstrate the invention. One model aircraft was constructed as illustrated in FIGS. 1 and 2, i.e., having spoilers 30, 32 formed on the top surface 36 of the aircraft 10 and used in association with the elevator 34. Another model was constructed having conventional elevons and no spoilers to demonstrate a baseline of performance. With the conventional elevon model, the roll at high lift coefficients is accompanied by a strong adverse yaw, which must be kept in check by a substantial fin. With the model having topside spoilers only, however, full roll control was obtained without any fins at all. Several flights were made with both models and it was apparent that the topside only spoilers model was easier to control and maintained more spiral stability. For control, it exhibited essentially no bad characteristics. In terms of performance, the power level setting for maintaining level flight was about the same as for the conventional model. Since the establishing of a bank angle takes very little time, compared to the total flight time, any reduction in efficiency is difficult to observe. However, as noted, there was no need for any fin at all. That is, whatever directional stability value is available with the swept back wing, that is all that is needed when the roll device is free of any adverse yaw. On the models, the canceling of the up pitch (caused by the fact that the spoilers only go up) was accomplished without modifying anything. The transmitter is programmable and advantage was taken of that by coupling the lateral controls (connected to the spoilers) with the elevator so that if either spoiler went up, the elevator went down a bit. Trial and error determining the exact amount of mixing. This arrangement was evaluated on two other configurations: a high aspect ratio straight wing flying wing, and a medium aspect ratio swept back flying wing. All three configurations had the elevator behind the spoilers. It was most successful on the diamond shape.

The invention encompasses a method for providing roll control of the low-observable aircraft 10 having a pair of swept back wings 16, 18. The method includes positioning a spoiler on a top surface of each of the pair of swept back wings and positioning an elevator on an aft portion of the pair of swept back wings 16, 18. In accordance with an embodiment of the invention, the elevator is positioned generally aft of the spoilers and generally disposed symmetrically between the spoilers. The method also includes individually operating each of the spoilers and the elevon to provide roll control of the low-observable aircraft by taking advantage of the swept back wing's ability to convert yaw movement into roll.

Whereas particular embodiments of this invention have been described above for purposes of illustration, it will be evident to those skilled in the art that numerous variations of the details of the present invention may be made without departing from the invention as defined in the appended claims.

What is claimed is:

1. A low-observable aircraft, comprising:
   an integrated fuselage and first and second swept back wings that generally define the aircraft;
   a first spoiler control surface positioned on a top surface of said first swept back wing;
   a second spoiler control surface positioned on a top surface of said second swept back wing;
   a third control surface integrally formed with said integrated fuselage and said first and second swept back wings; and
   wherein the low-observable aircraft includes no additional control surfaces.

2. The low-observable aircraft of claim 1, wherein said third control surface is an elevator.

3. The low-observable aircraft of claim 1, wherein said first and second swept back wings each include a first and second trailing edge respectively, said third control surface formed adjacent said first and second trailing edges.

4. The low-observable aircraft of claim 3, wherein said third control surface includes a first end that terminates adjacent said first trailing edge and a second end that terminates adjacent said second trailing edge.

5. The low-observable aircraft of claim 1, wherein said third control surface is positioned generally aft of said first and second spoiler control surfaces.

6. The low-observable aircraft of claim 1, wherein the low-observable aircraft includes no additional spoilers.

7. The low-observable aircraft of claim 1, wherein said first spoiler control surface includes a first longitudinal axis that extends generally parallel to a trailing edge of said first swept back wing.

8. The low-observable aircraft of claim 1, wherein said second spoiler control surface includes a second longitudinal axis that extends generally parallel to a trailing edge of said second swept back wing.

9. The low-observable aircraft of claim 1, wherein said first and second spoiler control surfaces are positioned adjacent a first and second trailing edge, respectively, of said first and second swept back wings.

10. The low-observable aircraft of claim 1, wherein said first and second spoilers control surfaces are structured and arranged to provide roll control for the low-observable aircraft.

11. A system for providing roll control of a low-observable aircraft having a pair of swept back wings, the system comprising:
   a spoiler control surface formed on a top surface only of each of the pair of swept back wings;
   an elevator control surface formed on an aft portion of the pair of swept back wings, said elevator being generally aft of said spoilers and generally disposed symmetrically between said spoilers; and
   wherein the low-observable aircraft includes no additional control surfaces.

12. The system of claim 11, wherein said spoiler control surfaces are positioned adjacent said elevator control surface on the aft portion of the swept back wings.

13. The system of claim 11, wherein said spoilers spoiler control surfaces and said elevator control surface are individually movably connected to the pair of swept back wings for control of roll, and wherein the swept back wing is utilized for conversion of yaw movement into roll movement of the low-observable aircraft.

14. The system of claim 11, wherein the system includes no additional means for providing roll control of the low-observable aircraft.

15. The system of claim 11, wherein said elevator control surface includes a first end that terminates adjacent a first trailing edge of the pair of swept back wings and a second end that terminates adjacent a second trailing edge of the pair of swept back wings.

16. The system of claim 11, wherein said spoilers spoiler control surfaces are positioned adjacent a first and second trailing edge of the pair of swept back wings.

* * * * *

UNITED STATES PATENT AND TRADEMARK OFFICE
CERTIFICATE OF CORRECTION

PATENT NO. : 7,108,230 B2
APPLICATION NO. : 10/456176
DATED : September 19, 2006
INVENTOR(S) : Walter D. Clark It is certified that error appears in the above-identified patent and that said Letters Patent is hereby corrected as shown below:

Claim 13 (Column 6, Line 46)
"...wherein said spoilers spoiler..." should read --...wherein said spoiler...--

Claim 16 (Column 6, Line 60)
"...wherein said spoilers spoiler..." should read --...wherein said spoiler...--

Signed and Sealed this

Twentieth Day of February, 2007

JON W. DUDAS
*Director of the United States Patent and Trademark Office*